(12) United States Patent  
Sahu

(10) Patent No.: US 11,193,876 B2  
(45) Date of Patent: Dec. 7, 2021

(54) COMPACT PARTICULATE MATERIAL SENSOR

(71) Applicant: Apple Inc., Cupertino, CA (US)

(72) Inventor: Saroj K. Sahu, Fremont, CA (US)

(73) Assignee: Apple Inc., Cupertino, CA (US)

( * ) Notice: Subject to any disclaimer, the term of this patent is extended or adjusted under 35 U.S.C. 154(b) by 146 days.

(21) Appl. No.: 16/147,559

(22) Filed: Sep. 28, 2018

(65) Prior Publication Data

US 2019/0101485 A1 Apr. 4, 2019

Related U.S. Application Data

(60) Provisional application No. 62/566,297, filed on Sep. 29, 2017.

(51) Int. Cl.
| | |
|---|---|
| *G01N 15/14* | (2006.01) |
| *H04M 1/21* | (2006.01) |
| *G01N 15/06* | (2006.01) |
| *G01N 15/00* | (2006.01) |

(52) U.S. Cl.
CPC ......... *G01N 15/1434* (2013.01); *G01N 15/06* (2013.01); *H04M 1/21* (2013.01); *G01N 2015/0046* (2013.01); *G01N 2015/0693* (2013.01); *H04M 2250/12* (2013.01)

(58) Field of Classification Search
CPC ............. G01N 15/06; G01N 2015/0046
See application file for complete search history.

(56) References Cited

U.S. PATENT DOCUMENTS

| | | | | |
|---|---|---|---|---|
| 4,761,680 | A | * | 8/1988 | Longeway ............ H01L 31/105 257/189 |
| 5,319,182 | A | * | 6/1994 | Havens .............. G06K 7/10722 235/440 |
| 5,421,337 | A | * | 6/1995 | Richards-Kortum ........................ A61B 5/0071 600/477 |
| 6,490,530 | B1 | * | 12/2002 | Wyatt ................... G01N 1/2202 702/23 |
| 10,043,050 | B2 | * | 8/2018 | Huang ..................... G06T 11/60 |
| 10,257,330 | B1 | * | 4/2019 | Mercer ............. H04M 1/72538 |
| 2015/0170490 | A1 | * | 6/2015 | Shaw ................... G08B 17/103 250/459.1 |
| 2019/0178775 | A1 | * | 6/2019 | Feng ..................... G01N 1/2273 |
| 2019/0195769 | A1 | * | 6/2019 | McBrady ........... G01N 15/0205 |
| 2020/0393351 | A1 | * | 12/2020 | Etschmaier ............ G01N 15/06 |

FOREIGN PATENT DOCUMENTS

CN 108139310 * 6/2018

* cited by examiner

*Primary Examiner* — Rebecca C Bryant  
(74) *Attorney, Agent, or Firm* — Morgan, Lewis & Bockius LLP

(57) ABSTRACT

A particulate matter sensing device includes a light source to generate a pulsed light at a first wavelength in response to a drive pulse. The device further includes one or more photodetectors. A thin-film filter is formed over the photodetectors and is tuned to be transparent to scattered light having a second wavelength substantially equal to the first wavelength. The scattered light is produced as a result of scattering of the pulsed light by the particulate matter. A charge collection circuit of the plurality of photodetectors electronically rejects background light.

20 Claims, 7 Drawing Sheets

COMPACT PARTICULATE MATERIAL SENSOR

CROSS-REFERENCE TO RELATED APPLICATIONS

This application is a continuation of the provisional Application No. 62/566,297, filed Sep. 29, 2017, which is incorporated by reference herein by its entirety.

TECHNICAL FIELD

The present description relates generally to sensor technology, and more particularly, to a compact particulate material sensor.

BACKGROUND

Many mobile electronic devices are equipped with sensors and transducers that enable the device to perform far more functionalities than communications. Media playing, photography, location detection, online shopping, social media, online banking, calendar, health applications such as heart beat, blood pressure and blood oxygen level measurement are among the numerous applications that a smart mobile communication device can facilitate. Gas sensors can help the mobile electronic device to detect various environmental gases such as carbon dioxide, carbon monoxide, ozone, volatile organic compounds (VOCs) and the like.

Particulate air pollution is shown to have consistent association with illness exacerbations in people with respiratory disease as well as the rise in the number of death cases resulting from respiratory and cardiovascular disease among older people. Fine particulate matter 2.5 ($PM_{2.5}$), which is an inhalable particle pollution including particulates with diameters equal to or smaller than 2.5 µm, is only visible as a haze in the air only at elevated levels. The $PM_{2.5}$ pollution is not visible at low densities, but is quite hazardous as it can enter the longs through inhalation and probably never leave the body. Many existing dust particle detectors are stand-alone devices that use a pump to blow air into a dark tunnel, where the particulate air pollution is cast upon by infrared light and the back-scattered light is detected. These detectors may have a number of shortcomings and more importantly do not lend themselves to integration with portable communication devices, as they are large and need an air pump and a hole on the host device.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects, the subject technology is directed to a compact particulate material sensor device. The sensor device of the subject technology can detect light scattered from particulate material (e.g., dust particles) while rejecting contaminating light (e.g., the ambient light such as sun light and artificial light), both optically and electronically. The disclosed sensor device can be implemented as a stand-alone device or can be integrated with a system-on-chip (SOC), for example, of a consumer electronic device and/or system such as a portable communication device (e.g., a smart phone or a smart watch). In some implementations, the sensor device of the subject technology can be integrated into a surface (e.g., a flat surface on a back cover) of a phone, for example, near the phone camera. The disclosed sensor device can detect fine particulate matter 2.5 ($PM_{2.5}$) that is a part of the air pollution and can be a significant contributor to inhalation health hazard.

Figure 1:
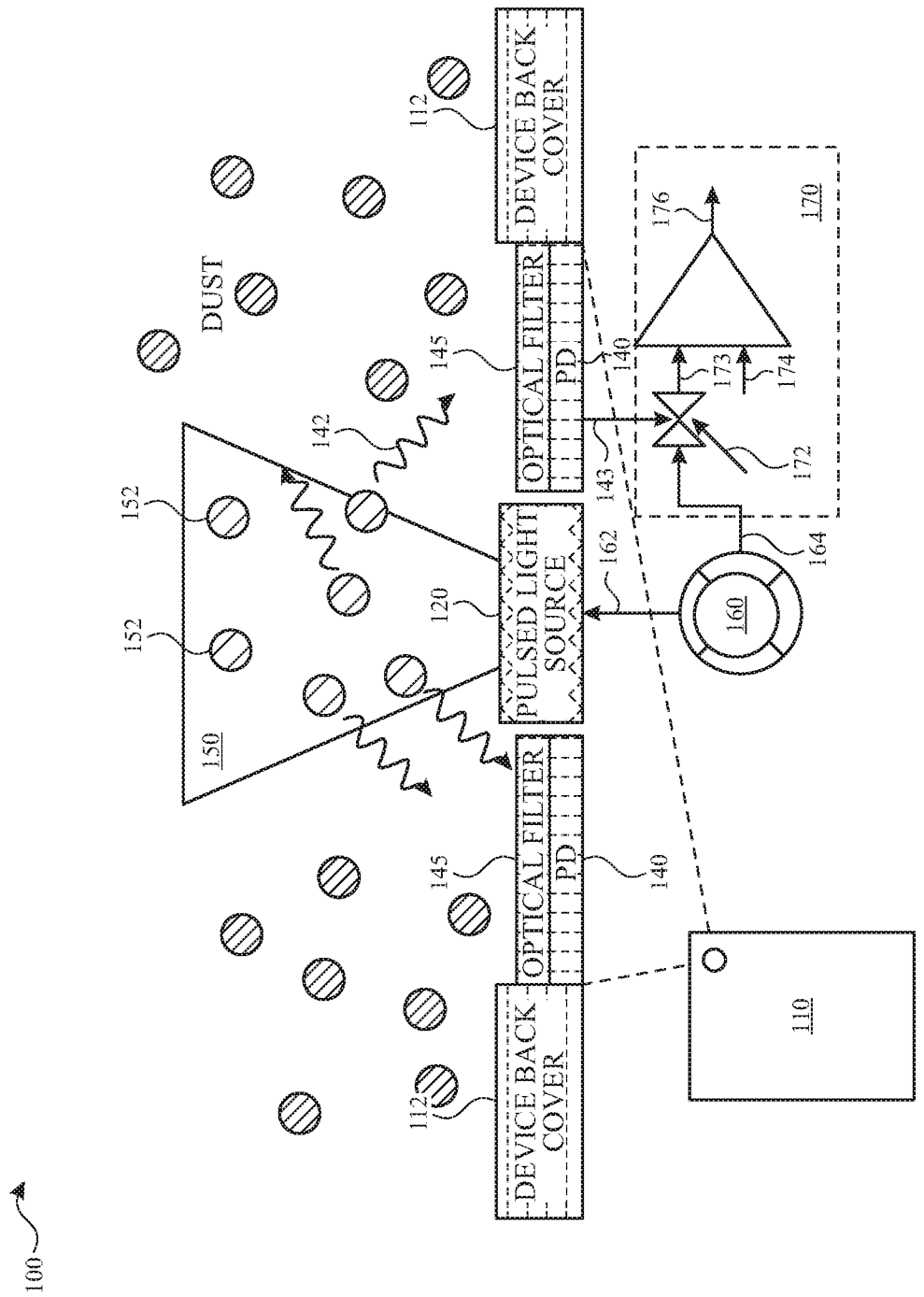
FIG. 1 is a conceptual diagram illustrating an example of a compact particulate material sensor device integrated with a portable communication device, in accordance with one or more aspects of the subject technology.

FIG. 1 is a conceptual diagram illustrating an example of a compact particulate material sensor device 100 integrated with a portable communication device, in accordance with one or more aspects of the subject technology. Not all of the depicted components may be used in all implementations; however, one or more implementations may include additional or different components than those shown in the FIG. 1. Variations in the arrangement and type of the components may be made without departing from the spirit or scope of the claims as set forth herein. Additional components, different components, or fewer components may be provided.

The compact particulate material sensor device (hereinafter "sensor device") 100 can be integrated with a SOC of a consumer electronic device such as a portable communication device 110 (e.g., a smart phone, a smart watch and the like). The sensor device 100, for example, can be realized on a flat surface such as a back cover 112 of the portable communication device 110 near the device camera. The sensor device 100 includes a light source 120, a number of photodetectors (PDs) 140, optical filters 145, a pulse generator 160 and a charge collection circuit 170. The light source 120 can be a pulsed light source such as a light-emitting diode (LED) that can operate at a suitable wavelength (e.g., about 1370 nm). The light source 120 is driven by drive pulses 162 generated by the pulse generator 160. In some embodiments, the pulse generator 160 generates the drive pulses 162 based on a clock signal, for example, associated with a host device such as the portable communication device 110. The pulses from the pulse generator 160 are simultaneously sent to the charge collection circuit 170 for synchronization purposes, as will be discussed in more detail herein. The light source 120 can illuminate a volume 150 in front of the light source 120 and can cast light upon the particulate material 152 (e.g., dust particles) within the illuminated volume 150.

The emitted light from the light source 120 can be scattered by particulate material 152, which forms a scattered light 142. The scattering of light from particulate matter is known as Tyndall effect or Willis-Tyndall scattering. The scattered light 142 has substantially the same wavelength as the wavelength (e.g., about 1370 nm) of the incident light from the light source 120. The scattered light 142 can be detected by the PDs 140. In some implementations, the PD 140 can be formed around the light source 120 in an arrangement that allows efficient detection of the scattered lights 142 from the particulate material 152. In some implementations, the PDs 140 can be photodiodes based on material including an alloy of two a III-V semiconducting material such as indium gallium arsenide (InGaAs), but is not limited to InGaAs. The light coming towards the PD 140 has to pass through the optical filter 145 for optical filtering, before being detected the PDs 140. The optical filter 145 can, for example, be a multilayer thin film filter with a suitable bandpass that can significantly reject background light and allow the scattered light 142 to reach the PDs 140. The background light includes the sunlight and indoor and outdoor artificial lighting.

The charge sensitive circuit 170 can generate a signal (e.g., a voltage signal) 176 based on the collected charge of the PDs 140 and in synchronization with the synch pulses 164 generated by the pulse generator 160. The charge sensitive circuit 170 can include a charge sensitive amplifier 175 that receives gated signals 173 from a gate 172 and the reference signal 174. The gate 172 receives signals 143 form the PDs 140 and the drive pulses 162 from the pulse generator 160 and generates gated signals 173. This is an electronic filtering feature of the subject technology that allows only signals form the PDs 140 that are received within a time window (e.g., a few μsec) around the timing of the synch pulses 164 generated by the pulse generator 160. The synch pulses 164 are the same as or synchronous with the drive pulses 162. In other words, the signals due to background light which are not synchronized with the synch pulses 164 are electronically filtered (in addition to optical filtering) and are not allowed to reach the charge sensitive amplifier 175. In some implementations, each photodiode of PDs 140 may have a respective charge sensitive circuit of its own.

Figure 2:
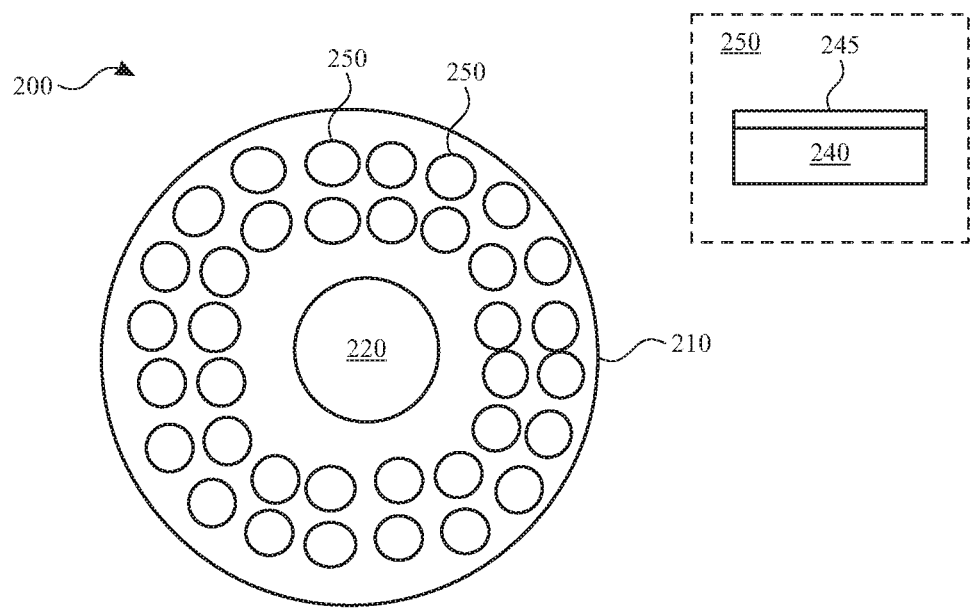
FIG. 2 is a conceptual diagram illustrating a top view of an example implementation of a compact particulate material sensor device, in accordance with one or more aspects of the subject technology.

FIG. 2 is a conceptual diagram illustrating a top view of an example implementation of a sensor device 200, in accordance with one or more aspects of the subject technology. Not all of the depicted components may be used in all implementations; however, one or more implementations may include additional or different components than those shown in the FIG. 2. Variations in the arrangement and type of the components may be made without departing from the spirit or scope of the claims as set forth herein. Additional components, different components, or fewer components may be provided.

The sensor device 200 is a compact particulate material sensor device. In the implementation depicted in the top view shown in FIG. 2, the sensor device 200 is formed on a semiconductor chip 210 and includes a light source 220 surrounded by an array of light detector assemblies 250. The semiconductor chip 210 may be a silicon chip of the host device (e.g., a smart phone or a smart watch). The array of light detector assemblies 250 are arranged in a ring configuration around the light source 220. The light source 220 is similar to the light source 120 of FIG. 1, the description of which is avoided herein for brevity. Each light detector assembly 250 includes a PD 240 and an optical filter 245 respectively similar to the PDs 140 and the optical filters 145 of FIG. 1. The number of light detector assemblies 250 in the array depends on the available surface area on the host device and the area of the light source 220, and determines a geometric detection efficiency of the sensor device 200. The geometric detection efficiency can be expressed as a ratio of the number of detected scattered light by the light detector assemblies 250 over the number of scattered lights (e.g., 142 of FIG. 1) generated in an illuminated volume (e.g., 150 of FIG. 1) illuminated by the light source 220. The configuration of the sensor device 200 may be suitable for integration with a smart watch with a circular shape.

Figure 3:
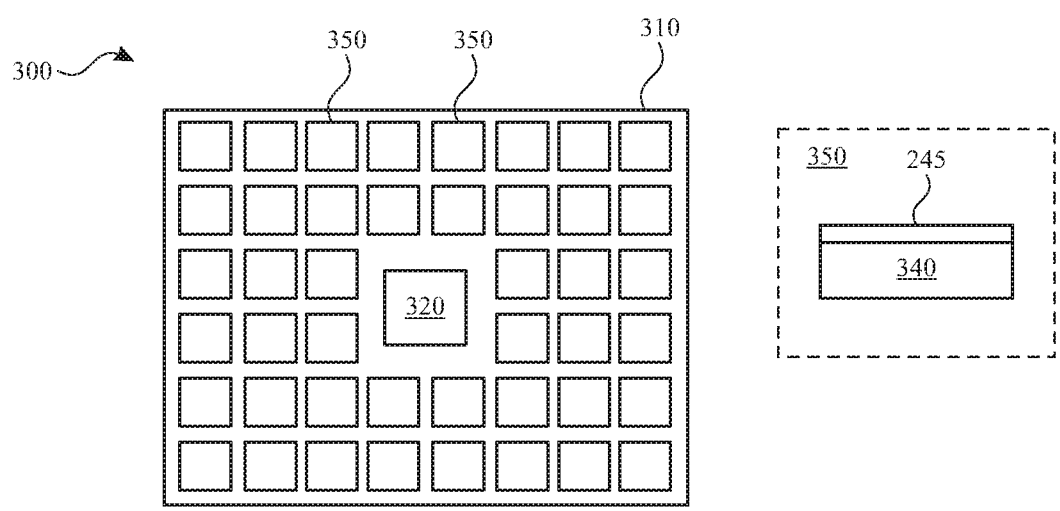
FIG. 3 is a conceptual diagram illustrating a top view of an example implementation of a compact particulate material sensor device, in accordance with one or more aspects of the subject technology.

FIG. 3 is a conceptual diagram illustrating a top view of an example implementation of a compact particulate material sensor device, in accordance with one or more aspects of the subject technology. Not all of the depicted components may be used in all implementations; however, one or more implementations may include additional or different components than those shown in the FIG. 3. Variations in the arrangement and type of the components may be made without departing from the spirit or scope of the claims as set forth herein. Additional components, different components, or fewer components may be provided.

The sensor device 300 is a compact particulate material sensor device. In the implementation depicted in the top view shown in FIG. 3, the sensor device 300 is formed on a semiconductor chip 310 and includes a light source 320 surrounded by an array of light detector assemblies 350. The semiconductor chip 310 may be a silicon chip of the host device (e.g., a smart phone or a smart watch). The array of light detector assemblies 350 are arranged in a square (or rectangular) configuration around the light source 320. The light source 320 is similar to the light source 120 of FIG. 1, the description of which is avoided herein for brevity. Each light detector assembly 350 includes a PD 340 and an optical filter 350 respectively similar to the PDs 140 and the optical filters 145 of FIG. 1. The number of light detector assemblies 250 in the array depends on the available surface area on the host device and the area of the light source 320, and determines the geometric detection efficiency of the sensor device 300.

Figure 4:
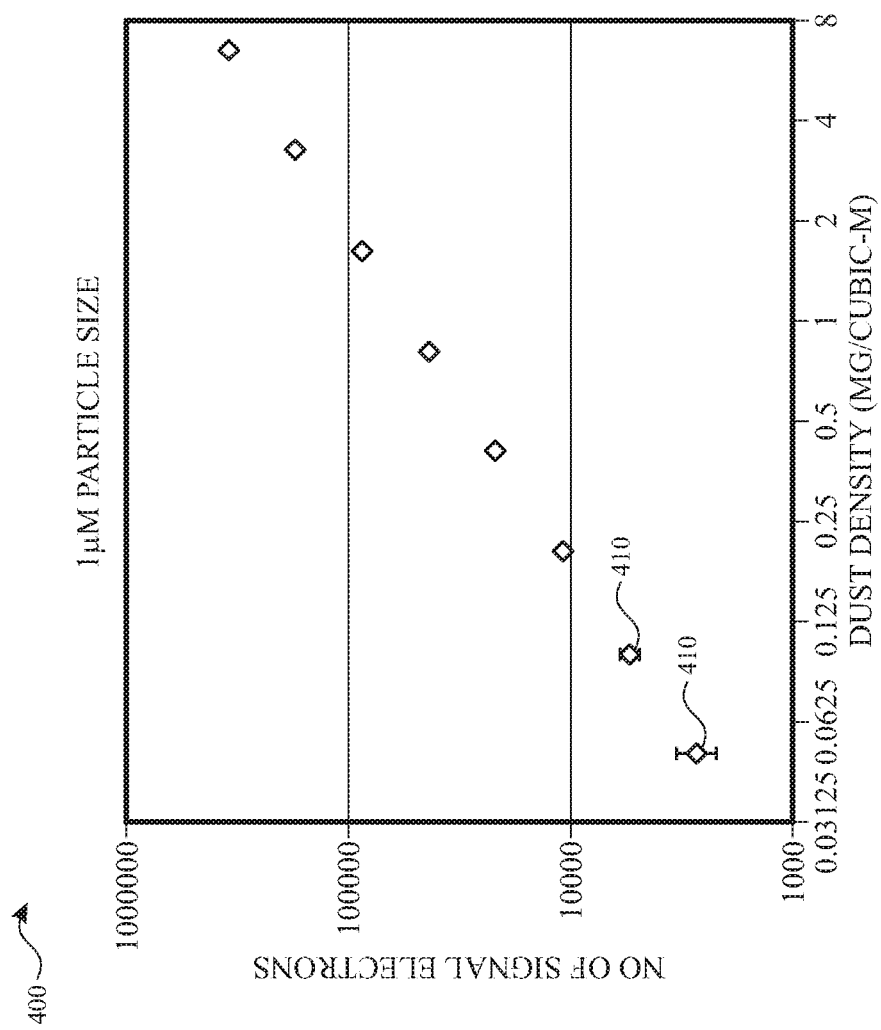
FIG. 4 is a chart illustrating an example sensitivity of a compact particulate material sensor device, in accordance with one or more aspects of the subject technology.

FIG. 4 is a chart illustrating an example sensitivity of a compact particulate material sensor device, in accordance with one or more aspects of the subject technology. The example sensitivity shown in the chart 400 is depicted as a plot of the number of signal electrons over the particulate dust density in mg/cubic-m. The dust density may, for example, correspond to particulate material with diameter smaller than or equal to about 2.5 µm (referred to as $PM_{2.5}$). The number of signal electrons corresponds to the detector signals (e.g., signals 173 of FIG. 1), the charge of which is collected by the charge sensitive amplifier 175 of FIG. 1. The error bars shown on data points 410 include photon statistics and electronic noise associated with the charge collection circuit (e.g., 170 of FIG. 1).

Figure 5:
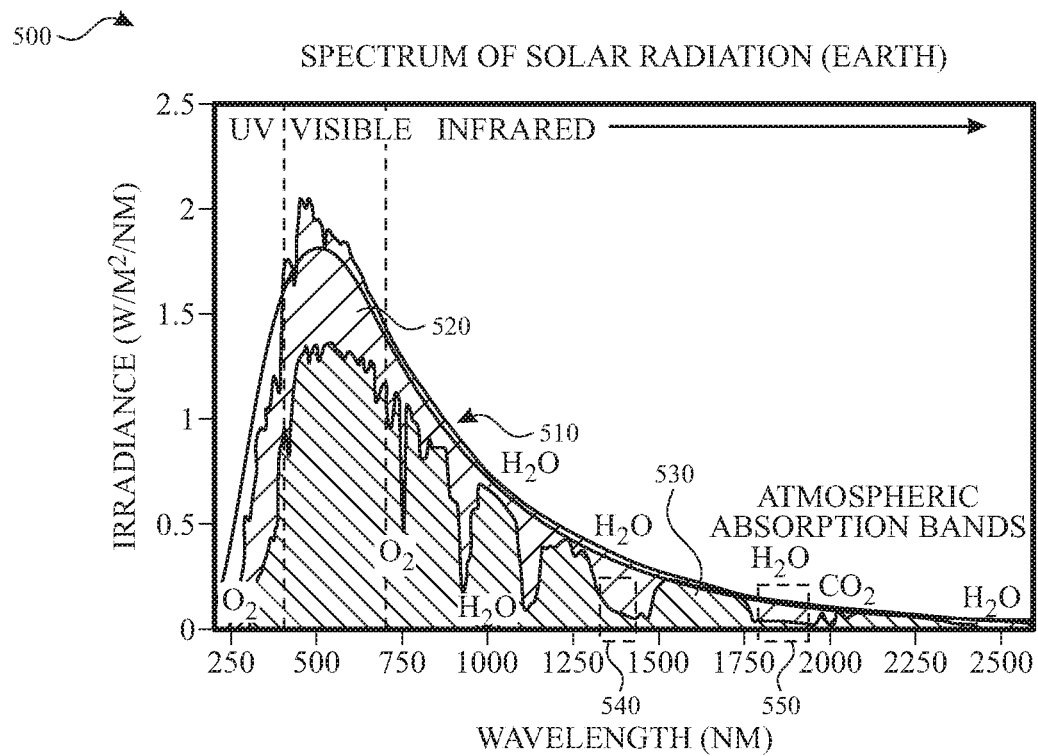
FIG. 5 is a chart illustrating a spectrum of solar radiation for determining sweet spots for a wavelength of the light source of the compact particulate material sensor device of the subject technology.

FIG. 5 is a chart illustrating a spectrum 500 of solar radiation for determining sweet spots for a wavelength of the light source of the compact particulate material sensor device of the subject technology. The subject technology uses two processes for effectively reducing the contribution of the background light in the sensor device (e.g., 100 of FIG. 1) charge collected by the charge sensitive amplifier (e.g., 175 of FIG. 1). The two processes, as discussed above, are the optical filtering by a notch thin film filter (e.g., 145 of FIG. 1) and the electronic filtering by synchronizing charge collection of the charge sensitive amplifier 175 with the same pulses (e.g., 164 of FIG. 1) that control the light source (e.g., 120 of FIG. 1) were discussed above. The optical filtering is based on a first wavelength used by the light source, as the light scattered by the particulate material has substantially similar wavelength. The first wavelength used by the light source for illuminating the particulate material has to be selected in a wavelength region that the background light such as the solar radiation and the artificial lighting are nearly zero. The spectrum 500 of the solar radiation shows areas 510, 520 and 530 corresponding to 5778K blackbody radiation, sunlight without atmospheric absorption and sunlight at sea level.

Further there are two regions (e.g., 540 and 550) of the solar spectrum 500 that absorption by water (e.g., water vapor) of the solar radiation reduces the level of solar radiation to nearly zero. The first region 540 includes a range of wavelengths between about 1355 nm and 1400 nm and is widely available for communications, such as coarse wavelength division multiplexing (CWDM). The second region 550 includes a range of wavelength between about 1820 nm and 1900 nm. The generation and detection of light in the second region 550 may require special semiconductors such as lead sulfide (PbS), which can be quite expensive. Regarding artificial lighting, it is known that no artificial lighting source has an emission with a wavelength above 1000 nm. Therefore the first region 540 appears to be the right candidate as the region of interest for the subject technology. Further selection criterion is the availability of photodetectors and optical filters discussed in more detail below.

Figure 6:
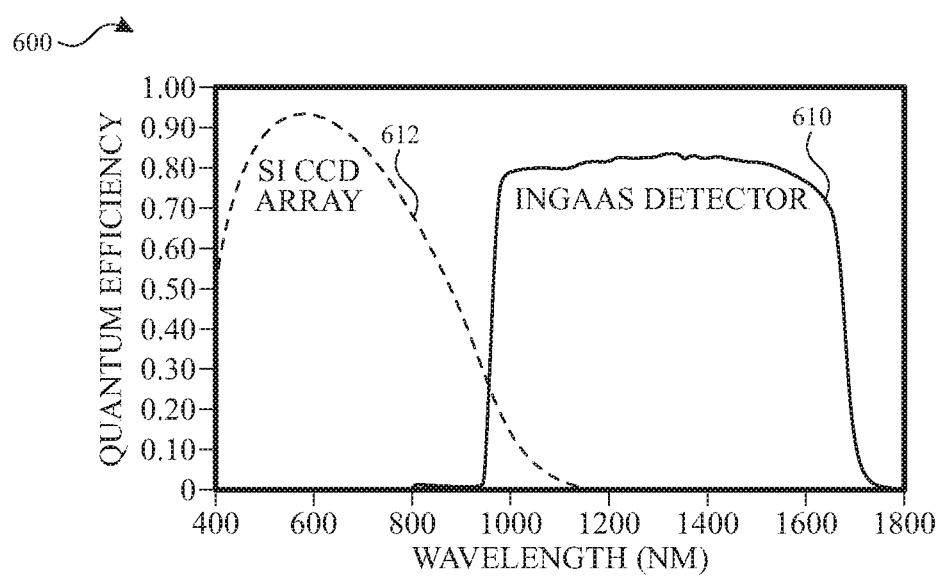
FIG. 6 shows charts illustrating quantum efficiency plots of photodetector material choices for the compact particulate material sensor device of the subject technology.

FIG. 6 shows charts illustrating quantum efficiency plots 610 and 612 of photodetector material choices for the compact particulate material sensor device of the subject technology. The plots 610 and 612 respectively show quantum efficiency (%) versus wavelength (nm) for an InGaAs photodetector and a silicon (Si) charge-coupled-device (CCD) array. The quantum efficiency of a photodetector (e.g., InGaAs or Si CCD) is known to be the ratio of the number of incident light photons that result in electric charge production in the photodetector to the total number of light photons reached the photodetector. The InGaAs photodetector has its highest quantum efficiency in the wavelength region of about 1000 nm to about 1700 nm that includes the first region 540 of FIG. 5, where the background radiation is nearly zero.

Figure 7:
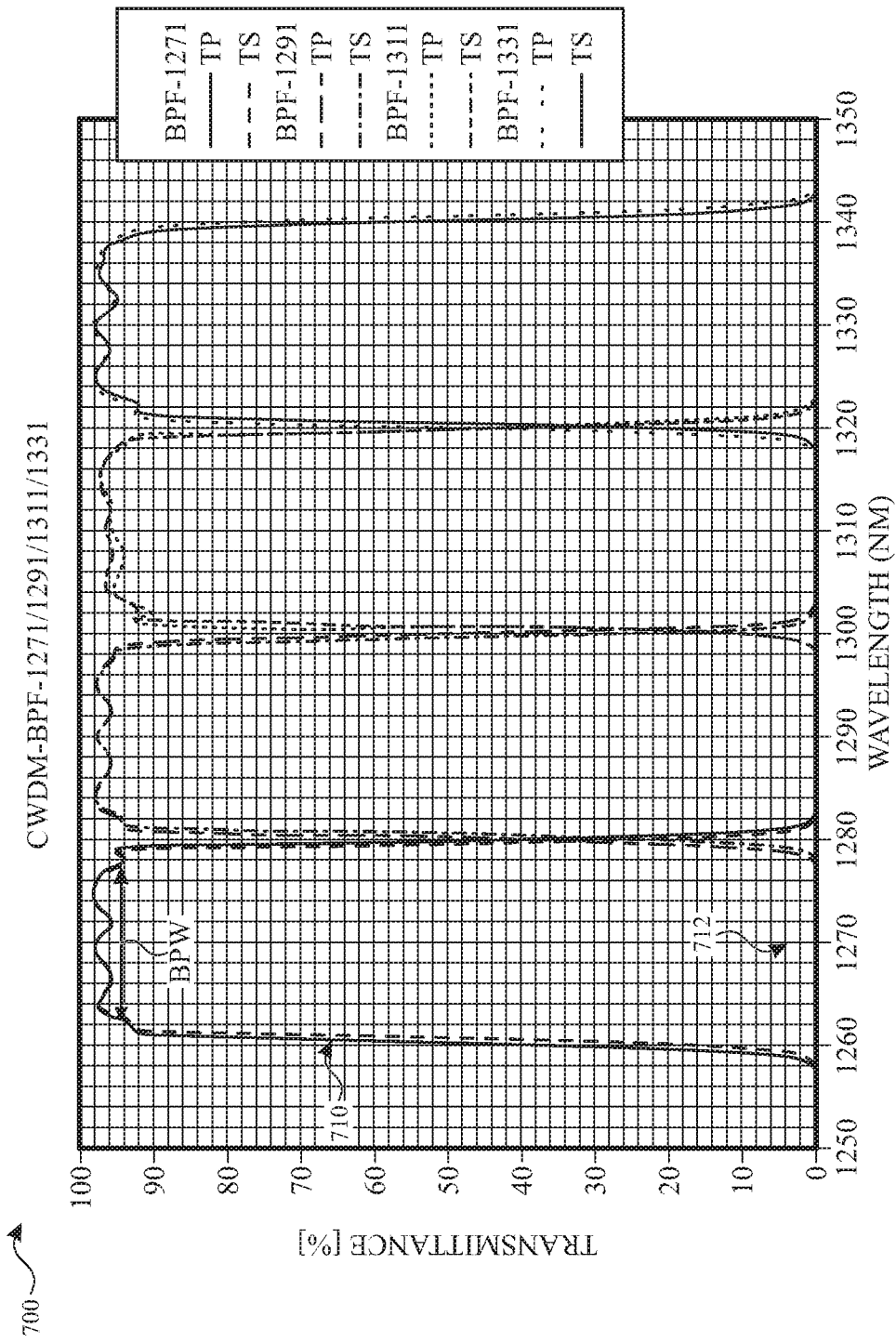
FIG. 7 is a chart illustrating frequency response of optical filter choices for the compact particulate material sensor device of the subject technology.

FIG. 7 is a chart 700 illustrating frequency response plots of optical filter choices for the compact particulate material sensor device of the subject technology. The chart 700 includes a number of frequency response plots for available thin film filters (e.g., CWDM filters) at various frequencies. For example, the plot 710 shows a frequency response centered at a center wavelength 712 of about 1270 nm and with a pass-band width (BPW) at 3 dB of about 16 nm. The available thin film filters are and/or can be implemented on a chip, for example, a SOC chip of a host device such as a smart phone or a smart watch. As seen from the plots of FIG. 7, the available thin film filters can have sharp edges and can be designed for transmission in the desired spectrum range (e.g., 1370±10 nm) for the optical filters of the subject technology.

Figure 8:
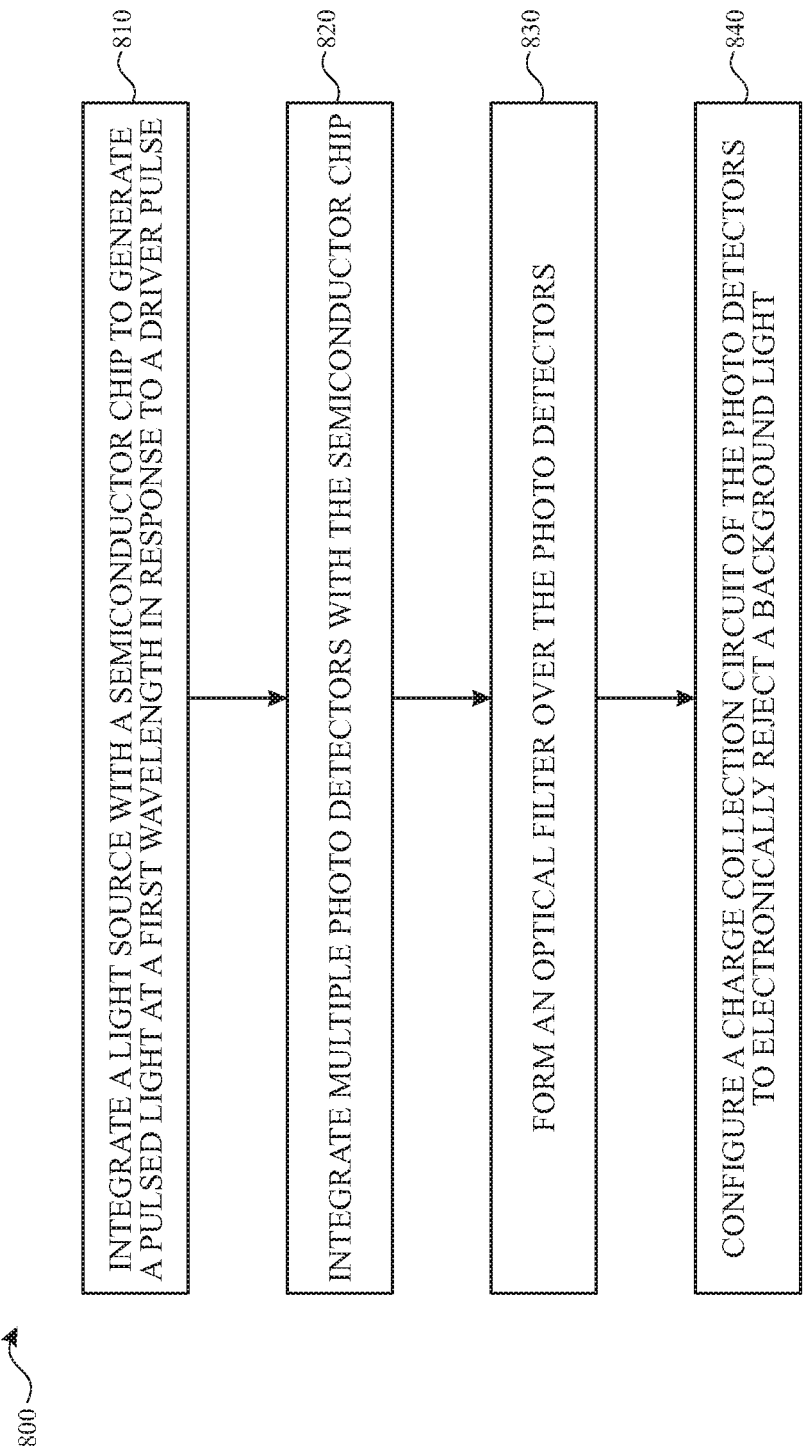
FIG. 8 is a flow diagram illustrating a process of a providing of a compact particulate material sensor device, in accordance with one or more aspects of the subject technology.

FIG. 8 is a flow diagram illustrating a process 800 of a providing of a compact particulate material sensor device, in accordance with one or more aspects of the subject technology. For explanatory purposes, the process 800 is primarily described herein with reference to the sensor device 100 of FIG. 1. However, the process 800 is not limited to the sensor device 100 of FIG. 1, and one or more blocks (or operations) of the process 800 may be performed by one or more other components of the sensor device 100 of FIG. 1. Further for explanatory purposes, the blocks of the process 800 are described herein as occurring in serial, or linearly. However, multiple blocks of the example process 800 may occur in parallel. In addition, the blocks of the example process 800 need not be performed in the order shown and/or one or more of the blocks of the example process 800 need not be performed.

The example process 800 begins with integrating a light source (e.g., 120 of FIG. 1) with a semiconductor chip (e.g., of the portable communication device 110 of FIG. 1) to generate a pulsed light at a first wavelength (e.g., 1370 nm) in response to a drive pulse (e.g., of drive pulses 162 of FIG. 1) (810). A number of photodetectors (e.g., 140 of FIG. 1) can be integrated with the semiconductor chip (820). An optical filter (e.g., 145 of FIG. 1) may be formed over the photodetectors (830). A charge collection circuit (e.g., 170 of FIG. 1) of the photodetectors may be configured to electronically reject a background light (e.g., as shown in FIG. 5) (840). The optical filter is transparent to scattered light (e.g., 142 of FIG. 1) from particulate matter (e.g., 152 of FIG. 1) shined by the light source. The scattered light is produced as a result of scattering of the pulsed light by the particulate matter.

Figure 9:
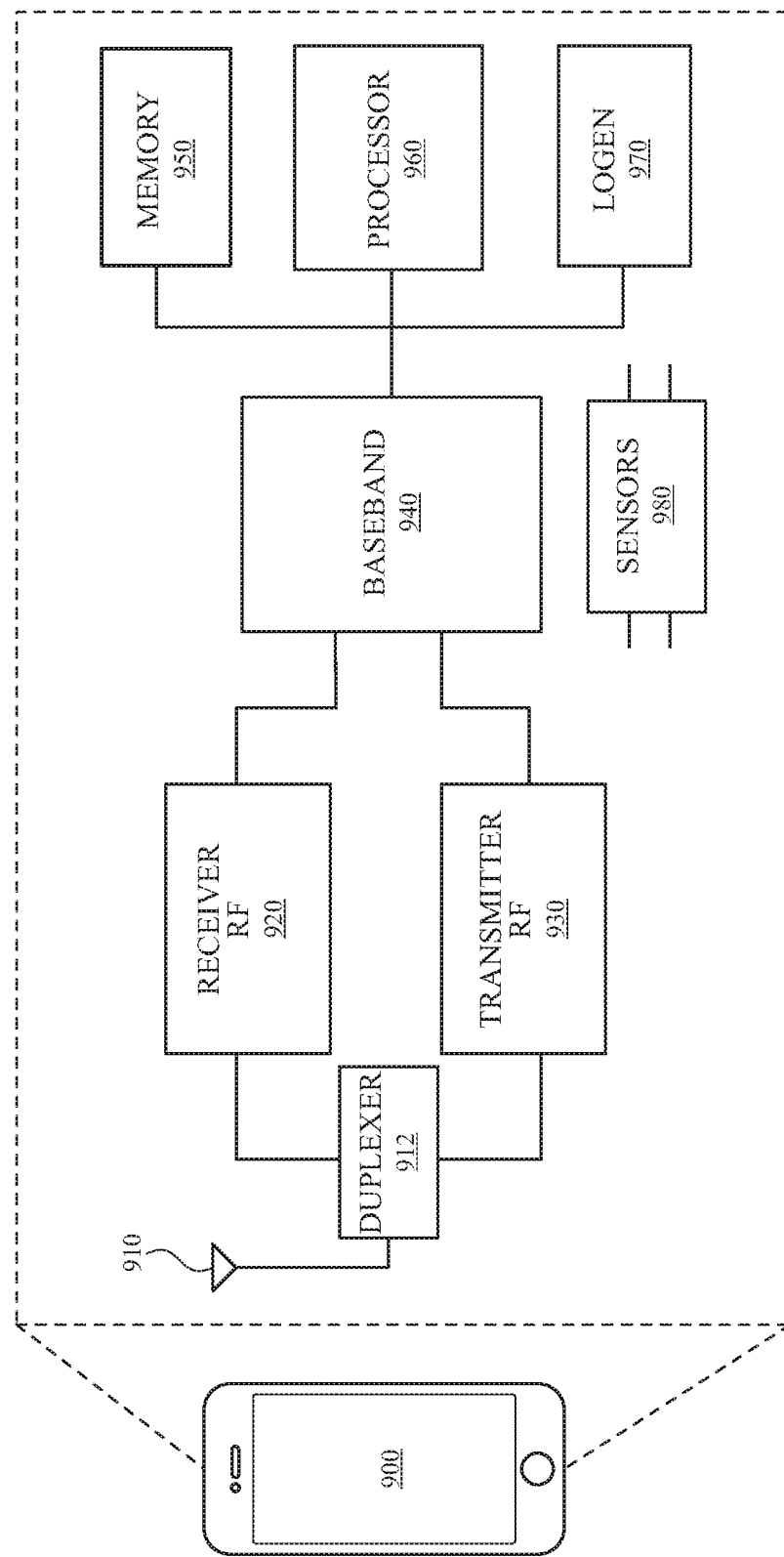
FIG. 9 is a block diagram illustrating an example wireless communication device, within which one or more environmental sensors of the subject technology can be integrated.

FIG. 9 is a block diagram illustrating an example wireless communication device, within which one or more environmental sensors of the subject technology can be integrated. The wireless communication device 900 can be a smart phone, a smart watch, a tablet, a phablet or other portable communication devices. Not all of the depicted components may be used in all implementations, however, one or more implementations may include additional or different components than those shown in the FIG. 9. Variations in the arrangement and type of the components may be made without departing from the spirit or scope of the claims as set forth herein. Additional components, different components, or fewer components may be provided.

The wireless communication device 900 may comprise a radio-frequency (RF) antenna 910, a receiver 920, a transmitter 930, a baseband processing module 940, a memory 950, a processor 960, a local oscillator generator (LOGEN) 970 and one or more sensors 980. In various embodiments of the subject technology, one or more of the blocks represented in FIG. 9 may be integrated on one or more semiconductor substrates. For example, the blocks 920-970 may be realized in a single semiconductor chip or a single system on a semiconductor chip, or may be realized in a multi-semiconductor chip semiconductor chipset.

The receiver 920 may comprise suitable logic circuitry and/or code that may be operable to receive and process signals from the RF antenna 910. The receiver 920 may, for example, be operable to amplify and/or down-convert received wireless signals. In various embodiments of the subject technology, the receiver 920 may be operable to cancel noise in received signals and may be linear over a wide range of frequencies. In this manner, the receiver 920 may be suitable for receiving signals in accordance with a variety of wireless standards, Wi-Fi, WiMAX, Bluetooth, and various cellular standards. In various embodiments of the subject technology, the receiver 920 may not require any SAW filters and few or no off-semiconductor chip discrete components such as large capacitors and inductors.

The transmitter 930 may comprise suitable logic circuitry and/or code that may be operable to process and transmit signals from the RF antenna 910. The transmitter 930 may, for example, be operable to up-convert baseband signals to RF signals and amplify RF signals. In various embodiments of the subject technology, the transmitter 930 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 930 may be operable to provide signals for further amplification by one or more power amplifiers.

The duplexer 912 may provide isolation in the transmit band to avoid saturation of the receiver 920 or damaging parts of the receiver 920, and to relax one or more design requirements of the receiver 920. Furthermore, the duplexer 912 may attenuate the noise in the receive band. The duplexer may be operable in multiple frequency bands of various wireless standards.

The baseband processing module 940 may comprise suitable logic, circuitry, interfaces, and/or code that may be operable to perform processing of baseband signals. The baseband processing module 940 may, for example, analyze received signals and generate control and/or feedback signals for configuring various components of the wireless communication device 900, such as the receiver 920. The baseband processing module 940 may be operable to encode, decode, transcode, modulate, demodulate, encrypt, decrypt, scramble, descramble, and/or otherwise process data in accordance with one or more wireless standards.

The processor 960 may comprise suitable logic, circuitry, and/or code that may enable processing data and/or controlling operations of the wireless communication device 900. In this regard, the processor 960 may be enabled to provide control signals to various other portions of the wireless communication device 900. The processor 960 may also control transfers of data between various portions of the wireless communication device 900. Additionally, the processor 960 may enable implementation of an operating system or otherwise execute code to manage operations of the wireless communication device 900.

The memory 950 may comprise suitable logic, circuitry, and/or code that may enable storage of various types of information such as received data, generated data, code, and/or configuration information. The memory 950 may comprise, for example, RAM, ROM, flash, and/or magnetic storage. In various embodiment of the subject technology, information stored in the memory 950 may be utilized for configuring the receiver 920 and/or the baseband processing module 940.

The local oscillator generator (LOGEN) 970 may comprise suitable logic, circuitry, interfaces, and/or code that may be operable to generate one or more oscillating signals of one or more frequencies. The LOGEN 970 may be operable to generate digital and/or analog signals. In this manner, the LOGEN 970 may be operable to generate one or more clock signals and/or sinusoidal signals. Characteristics of the oscillating signals such as the frequency and duty cycle may be determined based on one or more control signals from, for example, the processor 960 and/or the baseband processing module 940.

In operation, the processor 960 may configure the various components of the wireless communication device 900 based on a wireless standard according to which it is desired to receive signals. Wireless signals may be received via the RF antenna 910 and amplified and down-converted by the receiver 920. The baseband processing module 940 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 950, and/or information affecting and/or enabling operation of the wireless communication device 900. The baseband processing module 940 may modulate, encode, and perform other processing on audio, video, and/or control signals to be transmitted by the transmitter 930 in accordance with various wireless standards.

The one or more implementations, sensors 980 may include the sensor device 100 of FIG. 1. The sensor device 100 of the subject technology can be readily integrated into the wireless communication device 900, in particular when the wireless communication device 900 is a smart mobile phone or a smart watch.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A particulate matter sensing device for integration with a portable communication device, the device comprising:
    a light source configured to generate a pulsed light at a first wavelength in response to a drive pulse;
    a plurality of photodetectors; and
    a thin-film filter formed over the plurality of photodetectors and tuned to be transparent to scattered light having a second wavelength equal to the first wavelength,
    wherein:
    the scattered light is produced as a result of scattering of the pulsed light by the particulate matter,
    the light source and the plurality of photodetectors are located on a common flat surface, and the light source is surrounded by the plurality of photodetectors on the common flat surface, and
    a charge collection circuit of the plurality of photodetectors is configured to electronically reject background light that is not synched with the drive pulse.

2. The device of claim 1, wherein the thin-film filter comprises a bandpass filter tuned to optically reject the background light including ambient light by selectively passing the scattered light.

3. The device of claim 1, wherein the charge collection circuit of the plurality of photodetectors is synchronized with the drive pulse to electronically reject the background light.

4. The device of claim 1, wherein the light source and the plurality of photodetectors are formed over a semiconductor chip including electronic circuits configured to generate the drive pulse and to synchronize the charge collection circuit.

5. The device of claim 1, wherein the light source is arranged to be in a central position with respect to positions of the plurality of photodetectors.

6. The device of claim 1, wherein at least some of the plurality of photodetectors comprise a material including a direct bandgap alloy of two 111-V materials, and wherein the direct bandgap alloy comprises indium gallium arsenide (InGaAs).

7. The device of claim 1, wherein the first wavelength is within a range of 1350 to 1390 nm.

8. The device of claim 1, wherein the thin-film filter comprises a multilayer thin-film filter with a passband width of 40 nm.

9. The device of claim 1, wherein the particulate matter comprises $PM_{2.5}$, and wherein the second wavelength is within a range of about 1350 to 1390 nm.

10. A device for integration with a portable communication device, the device comprising:
    a semiconductor light source configured to generate a pulsed light in response to a drive pulse and configured to shine a volume including particulate matter; and
    one or more photodetectors integrated with an optical filter configured to be transparent to scattered light from the particulate matter within the volume,
    wherein:
    the scattered light has a second wavelength equal to a first wavelength associated with the semiconductor light source,
    the one or more photodetectors are coupled to a charge sensitive electronic circuit and are configured to reject background light that is not synched with the drive pulse, and
    the semiconductor light source and the one or more photodetectors are located on a common flat surface, and the light source is surrounded by the plurality of photodetectors on the common flat surface.

11. The device of claim 10, wherein the particulate matter comprises PM2.s.

12. The device of claim 10, wherein at least some of the one or more photodetectors comprise a material including an alloy of two 111-V materials, and wherein the material comprises indium gallium arsenide (InGaAs).

13. The device of claim 10, wherein the first wavelength is within a range of about 1350 to 1390 nm.

14. The device of claim 10, wherein the semiconductor light source and the one or more photodetectors are integrated with a semiconductor chip including the charge sensitive electronic circuit.

15. The device of claim 10, wherein the charge sensitive electronic circuit is configured to generate the drive pulse and to synchronize a charge collection of the one or more photodetectors with the drive pulse.

16. The device of claim 10, wherein the optical filter comprises a multilayer thin-film filter configured to have a passband width of less than about 30 nm centered about a wavelength of about 1370 nm.

17. A method comprising:
    integrating a light source with a semiconductor chip of a portable communication device, the light source generating a pulsed light at a first wavelength in response to a drive pulse;
    integrating a plurality of photodetectors with the semiconductor chip, while disposing the plurality of photodetectors to surround the light source on a flat surface;
    forming an optical filter over the plurality of photodetectors; and
    configuring a charge collection circuit of the plurality of photodetectors to electronically reject a background light that is not synched with the drive pulse,
    wherein:
    the optical filter is transparent to scattered light from particulate matter shined by the light source, and
    the scattered light is produced as a result of scattering of the pulsed light by the particulate matter.

18. The method of claim 17, further comprising arranging the light source to be in a central position with respect to the plurality of photodetectors, and wherein electronically
    rejecting the background light comprises synchronizing the charge collection circuit of the plurality of photodetectors with the drive pulse.

19. The method of claim 17, the light source comprises a light-emitting diode (LED) capable of generating light at a wavelength within a range of about 1350 to 1390 nm.

20. The method of claim 17, wherein forming the optical filter comprises forming a bandpass filter tuned to optically reject the background light including ambient light by selectively passing the scattered light.

* * * * *